US008451866B2

(12) United States Patent
Kim et al.

(10) Patent No.: US 8,451,866 B2
(45) Date of Patent: May 28, 2013

(54) APPARATUS AND METHOD FOR COMPOSING DIVERSITY SUBCHANNEL IN WIRELESS COMMUNICATION SYSTEM

(75) Inventors: Tae-Young Kim, Seongnam-si (KR); Jeong-Ho Park, Seoul (KR); Dong-Seek Park, Yongin-si (KR); Hee-Won Kang, Seongnam-si (KR); Ho-Kyu Choi, Seongnam-si (KR); Jae-Weon Cho, Suwon-si (KR); Hyun-Kyu Yu, Seoul (KR); Su-Ryong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 12/381,250

(22) Filed: Mar. 10, 2009

(65) Prior Publication Data

US 2009/0225714 A1 Sep. 10, 2009

(30) Foreign Application Priority Data

| Mar. 10, 2008 | (KR) | 10-2008-0022235 |
| Jul. 4, 2008 | (KR) | 10-2008-0064700 |
| Oct. 20, 2008 | (KR) | 10-2008-0102490 |
| Nov. 4, 2008 | (KR) | 10-2008-0109102 |
| Nov. 7, 2008 | (KR) | 10-2008-0110662 |
| Nov. 18, 2008 | (KR) | 10-2008-0114567 |
| Dec. 15, 2008 | (KR) | 10-2008-0127414 |
| Feb. 25, 2009 | (KR) | 10-2009-0016052 |
| Mar. 9, 2009 | (KR) | 10-2009-0020007 |

(51) Int. Cl.
    *H04J 3/00* (2006.01)

(52) U.S. Cl.
    USPC .......... 370/476; 370/437; 370/453; 370/458; 370/486

(58) Field of Classification Search
    USPC .......... 370/437, 453, 457, 458, 486
    See application file for complete search history.

(56) References Cited

U.S. PATENT DOCUMENTS 6,151,296 A 11/2000 Vijayan et al.
6,901,113 B2 * 5/2005 Le Strat et al. ............ 375/295

(Continued)

FOREIGN PATENT DOCUMENTS

| CN | 1930797 | 3/2007 |
| CN | 1930803 | 3/2007 |

(Continued)

OTHER PUBLICATIONS

International Search Report dated Oct. 28, 2009 in connection with PCT Application No. PCT/KR2009/001185.

(Continued)

*Primary Examiner* — Ricky Ngo
*Assistant Examiner* — Dewanda Samuel

(57) ABSTRACT

An apparatus and a method for composing a subchannel in a wireless communication system are provided. The method includes performing a subband-based permutation on resources for composing a subchannel; selecting one or more subbands as resources for a band selection subchannel from the resources passing through the subband-based permutation; composing the band selection subchannel using at least one of the selected subbands; performing a resource allocation unit based permutation on resources not selected for the band selection subchannel; composing a resource allocation unit based diversity subchannel using subband remained in the selected subbands after the band selection subchannel is composed and at least one of the resource allocation units of the resources passing through the resource allocation unit based permutation; and composing a tone-based diversity subchannel by performing a tone-based permutation on resources remained after the resource allocation unit based diversity subchannel is composed.

31 Claims, 9 Drawing Sheets

U.S. PATENT DOCUMENTS

| | | | |
|---|---|---|---|
| 7,668,253 B2 | 2/2010 | Hwang et al. | |
| 7,729,310 B2 * | 6/2010 | Kim | 370/330 |
| 7,848,295 B2 | 12/2010 | Kang et al. | |
| 2005/0195909 A1 * | 9/2005 | Hwang et al. | 375/260 |
| 2005/0201309 A1 * | 9/2005 | Kang et al. | 370/310 |
| 2007/0053456 A1 * | 3/2007 | Kim | 375/260 |
| 2007/0105508 A1 | 5/2007 | Tong et al. | |
| 2007/0263735 A1 | 11/2007 | Tong et al. | |
| 2008/0075032 A1 * | 3/2008 | Balachandran et al. | 370/317 |
| 2009/0122901 A1 * | 5/2009 | Choi et al. | 375/267 |
| 2010/0040080 A1 * | 2/2010 | Um et al. | 370/437 |
| 2010/0103895 A1 * | 4/2010 | Cho et al. | 370/329 |

FOREIGN PATENT DOCUMENTS

| | | |
|---|---|---|
| KR | 10-2006-0134853 | 12/2006 |
| KR | 10-2007-0116436 | 12/2007 |
| RU | 2216873 C2 | 11/2003 |
| WO | WO 2006/137708 A1 | 12/2006 |
| WO | WO 2007/142393 A1 | 12/2007 |

OTHER PUBLICATIONS

Carle Lengoumbi, et al., "Subchannelization Performance for the Downlink of a Multi-Cell OFDMA System", Third IEEE International Conference on Wireless and Mobile Computing, Networking and Communication (WiMob 2007), 2007 IEEE, 6 pages.

Russian Decision to Grant (with translation) dated Oct. 24, 2012 in connection with Russian Patent Application No. 2010137685/07, 22 pages.

Partial Translation dated Jun. 15, 2012 in connection with Mexican Patent Application No. MX/a/2010/009144, 5 pages.

Chinese Office Action dated Jan. 16, 2013 in connection with Chinese Application No. 2009801084336, 11 pages.

* cited by examiner

APPARATUS AND METHOD FOR COMPOSING DIVERSITY SUBCHANNEL IN WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Mar. 10, 2008 and assigned Serial No. 10-2008-0022235, a Korean patent application filed in the Korean Intellectual Property Office on Jul. 4, 2008 and assigned Serial No. 10-2008-0064700, a Korean patent application filed in the Korean Intellectual Property Office on Oct. 20, 2008 and assigned Serial No. 10-2008-0102490, a Korean patent application filed in the Korean Intellectual Property Office on Nov. 4, 2008 and assigned Serial No. 10-2008-0109102, a Korean patent application filed in the Korean Intellectual Property Office on Nov. 7, 2008 and assigned Serial No. 10-2008-0110662, a Korean patent application filed in the Korean Intellectual Property Office on Nov. 18, 2008 and assigned Serial No. 10-2008-0114567, a Korean patent application filed in the Korean Intellectual Property Office on Dec. 15, 2008 and assigned Serial No. 10-2008-0127414, a Korean patent application filed in the Korean Intellectual Property Office on Feb. 25, 2009 and assigned Serial No. 10-2009-0016052, a Korean patent application filed in the Korean Intellectual Property Office on Mar. 9, 2009 and assigned Serial No. 10-2009-0020007, the entire disclosure of which is hereby incorporated by reference.

TECHNICAL FIELD OF THE INVENTION

The present invention relates generally to an apparatus and a method for composing a subchannel in a wireless communication system. More particularly, the present invention relates to an apparatus and a method for composing a diversity subchannel in the wireless communication system.

BACKGROUND OF THE INVENTION

An Orthogonal Frequency Division Multiplexing (OFDM) wireless communication system divides a frequency band into subchannels and transmits data on the subchannels at the same time.

The OFDM wireless communication system classifies the subchannel composition to a band selection subchannel and a diversity subchannel.

The band selection subchannel includes adjacent subcarriers and, thus, has a similar channel condition. Correspondingly, terminals can maximize a transmission capacity by adopting an adaptive modulation and coding suitable for the band selection subchannels.

The diversity subchannel distributes its subcarriers over the entire frequency band to acquire a frequency diversity gain.

As stated above, the wireless communication system composes the band selection subchannel with the adjacent subcarriers of the similar channel condition, and the diversity subchannel with the subcarriers spread over the entire frequency band. The band selection subchannel and the diversity subchannel are used in the different environments.

What is needed is a method for composing the band selection subchannel and the diversity subchannel to be used according to the channel condition in the wireless communication system.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for composing a diversity subchannel and a band selection subchannel in a wireless communication system.

Another aspect of the present invention is to provide an apparatus and a method for composing a diversity subchannel using remaining resources after allocating resources for a band selection subchannel in a wireless communication system.

Yet another aspect of the present invention is to provide an apparatus and a method for composing a diversity subchannel using resources which are allocated to but not used as a band selection subchannel in a wireless communication system.

Still another aspect of the present invention is to provide an apparatus and a method for composing subchannels by dividing resources allocated for a diversity subchannel based on a frequency reuse factor in a wireless communication system.

A further aspect of the present invention is to provide an apparatus and a method for composing a diversity subchannel by conducting a resource unit based permutation and a tone/tile-based permutation on resources allocated for the diversity subchannel in a wireless communication system.

According to an aspect of the present invention, a method for composing a subchannel in a wireless communication system includes performing a subband-based permutation on resources for composing a subchannel; selecting one or more subbands as resources for a band selection subchannel from the resources passing through the subband-based permutation; composing the band selection subchannel using at least one of the selected subbands; performing a resource allocation unit based permutation on resources not selected for the band selection subchannel; composing a resource allocation unit based diversity subchannel using subband remained in the selected subbands after the band selection subchannel is composed and at least one of the resource allocation units of the resources passing through the resource allocation unit based permutation.

According to another aspect of the present invention, an apparatus for composing a subchannel in a wireless communication system includes a band selection subchannel composer for composing a band selection subchannel using at least one of one or more subbands selected as resources for the band selection subchannel by performing a subband-based permutation on the resources for composing a subchannel; and a diversity subchannel composer for composing a resource allocation unit based diversity subchannel using resources not selected for the band selection subchannel and resource allocation units of subbands remained in the subbands selected as the resources for the band selection subchannel after the band selection subchannel composition.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for composing subchannels in a wireless communication system; that is, a technique for composing a diversity subchannel and a band selection subchannel in the wireless communication system.

Hereinafter, the wireless communication system is assumed to adopt OFDM.

Figure 1:
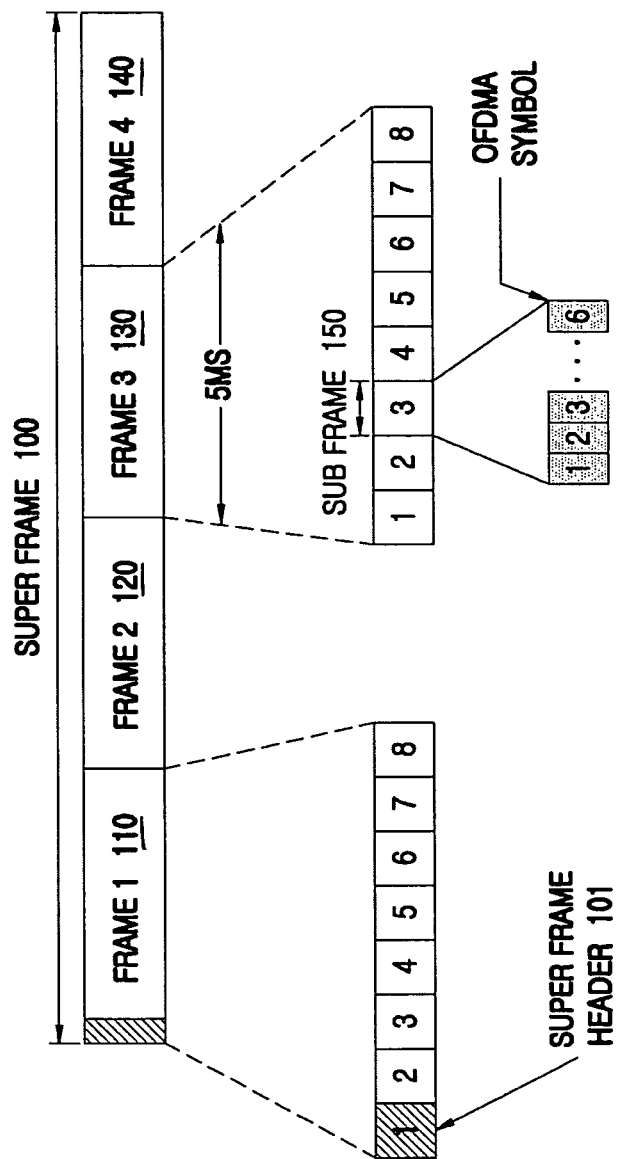
FIG. 1 illustrates a frame structure in a wireless communication system according to an exemplary embodiment of the present invention.

The wireless communication system is assumed to communicate using a frame of FIG. 1.

FIG. 1 illustrates a frame structure in a wireless communication system according to an exemplary embodiment of the present invention.

A super frame 100 of FIG. 1 includes a plurality of frames 110-140. The frame 110-140 includes a plurality of sub frames 150. The sub frame 150 includes a plurality of symbols. For example, the super frame 100 includes four frames 110-140, the frame 110-140 includes eight sub frames 150, and the sub frame 150 includes six OFDM symbols.

The super frame 100 includes a super frame header 101 which can include one or more symbols. The super frame header 101 includes a preamble and Broadcast Channel (BCH) information. The super frame header 101 is transmitted in every super frame 100. The preamble carries system synchronization information and base station Identifier (ID) information. Accordingly, a terminal can acquire the system synchronization and identify the currently connected base station based on the preamble. The BCH includes control information and subchannel composition information that are changed in a short cycle among information carried by a Downlink Channel Descriptor (DCD) and information carried by an Uplink Channel Descriptor (UCD). The cycle of the BCH is determined to a multiple of the length of the super frame 100 according to the control information of the BCH. The subchannel composition information includes Fractional Frequency Reuse (FFR) rate information and information relating to the number of Physical Resource Units (PRUs) of the band selection subchannel.

The frame constitutes a downlink subframe and an uplink subframe with a plurality of consecutive subframes.

As such, the wireless communication system hierarchically builds the frame and constitutes the sub frames with Resource Units (RUs). The RU indicates a basic unit of the resource allocation. For example, the wireless communication system forms the RU with eighteen (18) consecutive subcarriers in the frequency axis and six (6) consecutive symbols in the time axis. The RU includes a pilot tone per antenna.

The wireless communication system employs the FFR technique to overcome the shortcomings of the frequency reuse.

Figure 2:
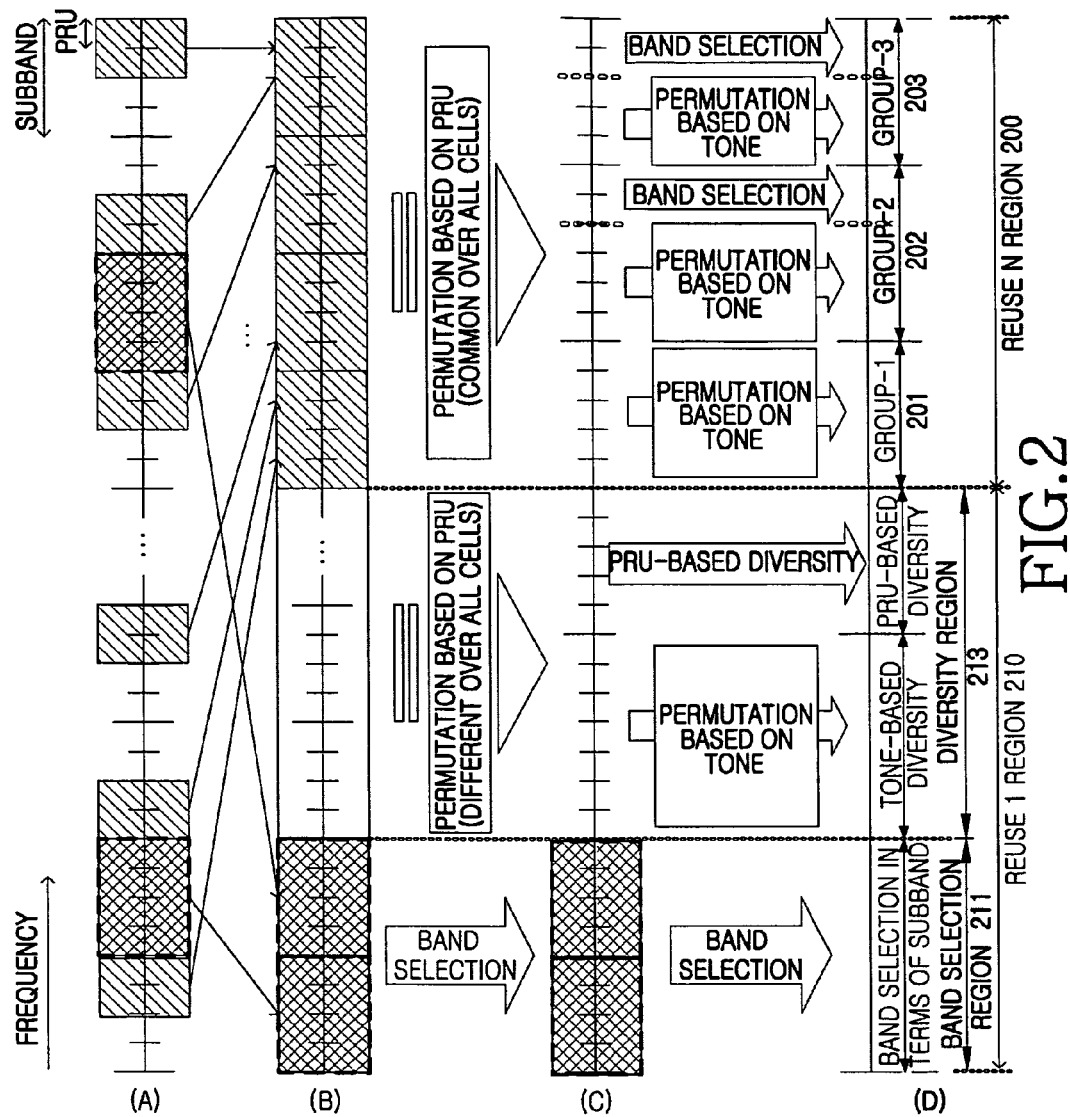
FIG. 2 illustrates a subchannel structure in a wireless communication system according to an exemplary embodiment of the present invention.

Using the FFR, the wireless communication system divides the entire frequency band to resources for a region of a frequency reuse factor N and resources for a region of the frequency reuse factor '1'. Hence, the wireless communication system can constitute the subchannel as shown in FIG. 2.

The region of the frequency reuse factor N indicates the resource region applying the FFR, and the region of the frequency reuse factor '1' indicates the resource region without the FFR.

In what follows, the wireless communication system is assumed to use the PRU as the fundamental unit for composing the subchannel. The PRU indicates a tile including a plurality of subcarrier bundles in the frequency resource axis and the time resource axis.

The wireless communication system operates the band selection subchannel on the subband basis, and terminals feed back their channel characteristic on the subband basis. The subband physically indicates a set of adjacent PRUs.

FIG. 2 illustrates the subchannel structure in the wireless communication system according to an exemplary embodiment of the present invention.

The entire frequency band of the physical channel includes a plurality of PRUs as shown by (A) FIG. 2. The adjacent PRUs constitute one subband.

To compose the subchannel, a base station selects PRUs to be allocated to the region 200 of the frequency reuse factor N from the entire frequency resources as shown by (B) in FIG. 2. The base station selects the PRUs to be allocated to the region 200 of the frequency reuse factor N according to the FFR rate.

Next, the base station selects PRUs for the band selection subchannel 211 of the region 210 of the frequency reuse factor '1' among the PRUs remained after the PRUs are allocated to the region of the frequency reuse factor N and, in so doing, the base station allocates the remaining PRUs to the diversity subchannel 213 of the region 210 of the frequency reuse factor '1'.

To compose the subchannel of the region 200 of the frequency reuse factor N, the base station randomly reorders the PRUs allocated to the region 200 of the frequency reuse factor N through the PRU-based permutation.

Next, the base station generates N-ary frequency reuse groups by dividing the resources of the region 200 of the frequency reuse factor N as shown by (C) in FIG. 2. For example, given the frequency reuse factor '3', the base station generates three frequency reuse groups 201, 202 and 203 by dividing the resources of the region 200 of the frequency reuse factor N.

After generating the frequency reuse groups for the PRUs in FIG. 2C, the base station composes the band selection subchannel by selecting PRUs for the band selection subchannel per frequency reuse group as shown by (D) in FIG. 2. Next, the base station allocates the PRUs remained after the allocation to the band selection subchannel per frequency reuse group, as PRUs for the diversity subchannel. Depending upon the diversity subchannel constitution manner, the base station can select PRUs for composing the tone-based diversity subchannel or tile-based diversity subchannel from the PRUs allocated to the diversity subchannel. Upon selecting the PRUs for composing the tone-based diversity subchannel, the base station constitutes the tone-based diversity subchannel by conducting the tone-based permutation on the selected PRUs. Distinctive permutations can be applied to the frequency reuse groups so as to differ the diversity resource allocation manner.

Upon selecting the PRUs for composing the tile-based diversity subchannel, the base station constitutes the tile-based diversity subchannel by conducting the tile-based permutation on the selected PRUs. Distinctive permutations can be applied to the frequency reuse groups so as to differ the diversity resource allocation manner.

To compose the subchannel of the region 210 of the frequency reuse factor '1', the base station constitutes the band selection subchannel 211 of the region 210 of the frequency reuse factor '1' the PRUs allocated for the band selection subchannel in FIG. 2B.

The base station composes the diversity subchannel 213 of the region 210 of the frequency reuse factor '1' by permutating the remaining PRUs after the allocation to the region 200 of the frequency reuse factor N and the band selection subchannel 211 of the region 210 of the frequency reuse factor '1' as shown in FIG. 2B. The cell or the sectors using the region 210 of the frequency reuse factor '1' constitute(s) the diversity subchannel 213 through different permutations.

Now, a method for composing the diversity subchannel of FIG. 2 is described.

Figure 3:
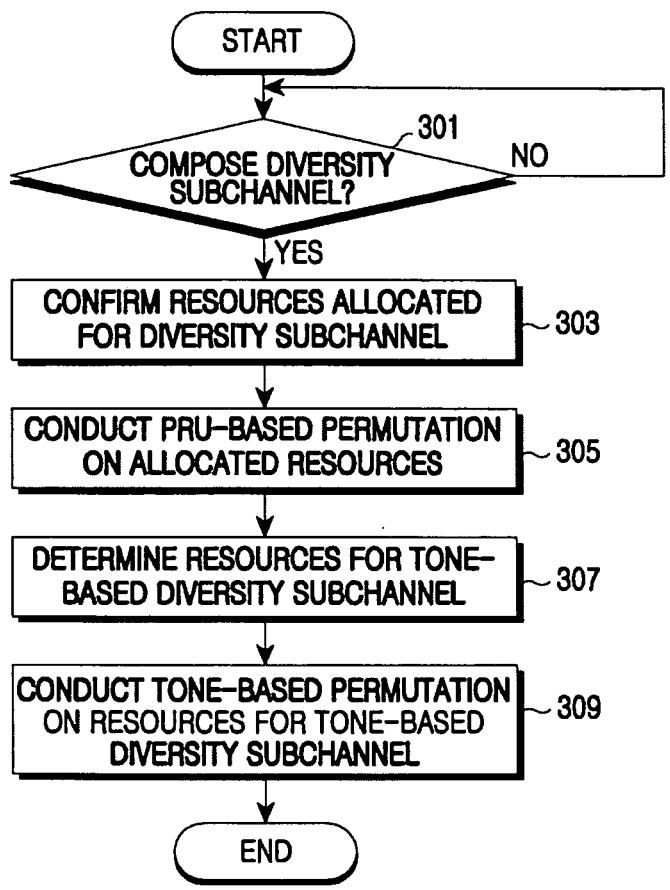
FIG. 3 illustrates a method for composing a diversity subchannel in the wireless communication system according to an exemplary embodiment of the present invention.

FIG. 3 is a flowchart outlining the method for composing the diversity subchannel in the wireless communication system according to an exemplary embodiment of the present invention.

In step 301, the base station determines whether to compose the diversity subchannel.

To compose the diversity subchannel, the base station confirms on the resources for building the diversity subchannel in step 303. For example, to compose the diversity subchannel in the region of the frequency reuse factor '1', the base station confirms on remaining PRUs after allocating for the region of the frequency reuse region N and the band selection subchannel of the region of the frequency reuse factor '1'.

In step 305, the base station permutates the confirmed resources on the PRU basis. For example, the base station randomly reorders the PRUs allocated to the diversity subchannel region 213 through the PRU-based permutation.

In step 307, the base station determines resources for composing the tone-based diversity subchannel or tile-based diversity subchannel.

In step 309, the base station conducts the tone-based permutation on the resources for composing the tone-based diversity subchannel or tile-based permutation on the resource for composing the tile-based diversity subchannel. For example, the base station builds the tone-based diversity subchannel by conducting the tone-based permutation on the remaining PRUs after the allocation to the PRU-based diversity subchannel in FIG. 2C. Alternatively, the base station builds the tile-based diversity subchannel by conducting the tile-based permutation on the remaining PRUs after the allocation to the PRU-based diversity subchannel in FIG. 2C.

Next, the base station finishes this process.

As state above, the base station composes the tone-based diversity subchannel through the PRU-based permutation and the tone-based tone permutation or the tile-based diversity subchannel through the PRU-based permutation and the tile-based tone permutation in addition.

The base station carries out the tone-based permutation in the basic unit of a tone pair including two adjacent tones. The tone pair is a set of two adjacent tones in one PRU. The base station can constitute the tone pair by taking into account the location of a pilot in the PRU. For example, given twelve (12) pilot tones in the PRU, the base station can constitute the tone pair as shown in FIGS. 4A and 4B.

Figure 4A:
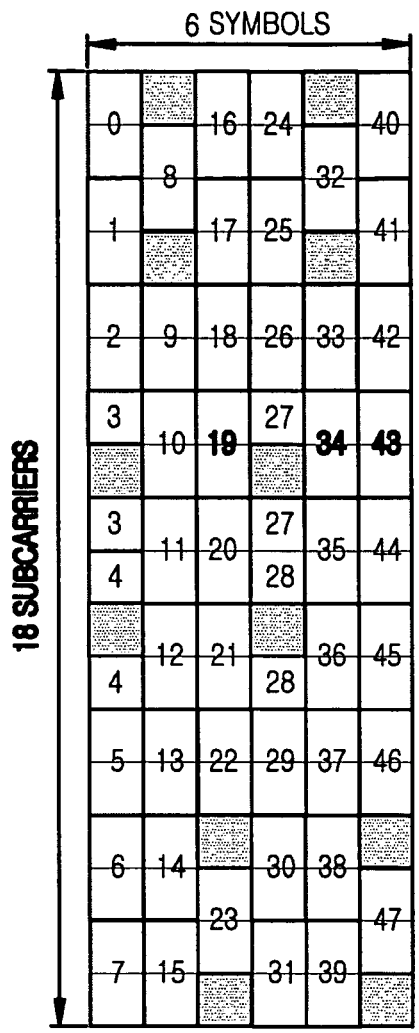
FIGS. 4A and 4B illustrate a resource unit for a tone-based permutation in the diversity subchannel in the wireless communication system according to one exemplary embodiment of the present invention.
Figure 4B:
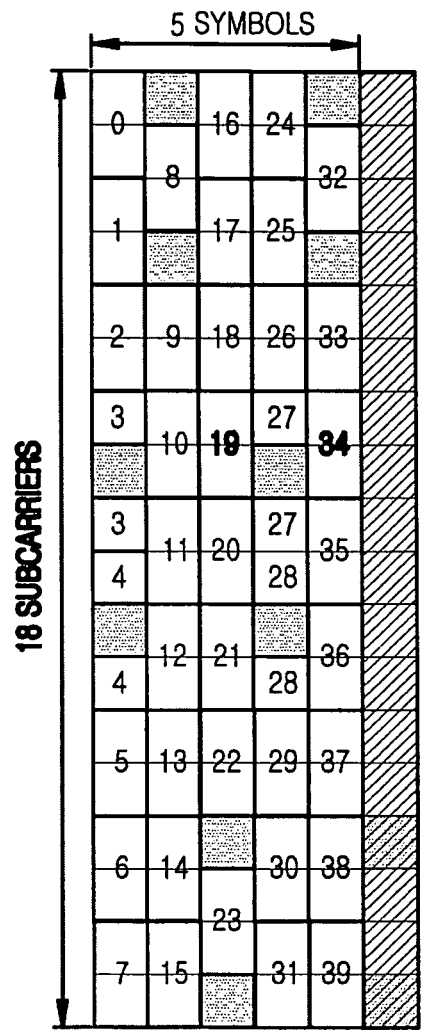

FIGS. 4A and 4B depict the RU for the tone-based permutation in the diversity subchannel in the wireless communication system according to one exemplary embodiment of the present invention.

FIG. 4A shows a regular PRU and FIG. 4B shows an irregular PRU.

In FIG. 4A, the base station forms one tone pair with two adjacent data tones in the frequency axis and thus produces forty-eight (48) tone pairs in order. The base station indexes the tone pairs preferentially in the frequency axis.

In FIG. 4B, when not able to transmit data using the last symbol of the PRU, the base station produces forty (40) tone pairs in order by forming one tone pair with two adjacent data tones in the frequency axis. The base station indexes the tone pairs preferentially in the frequency axis.

Figure 5A:
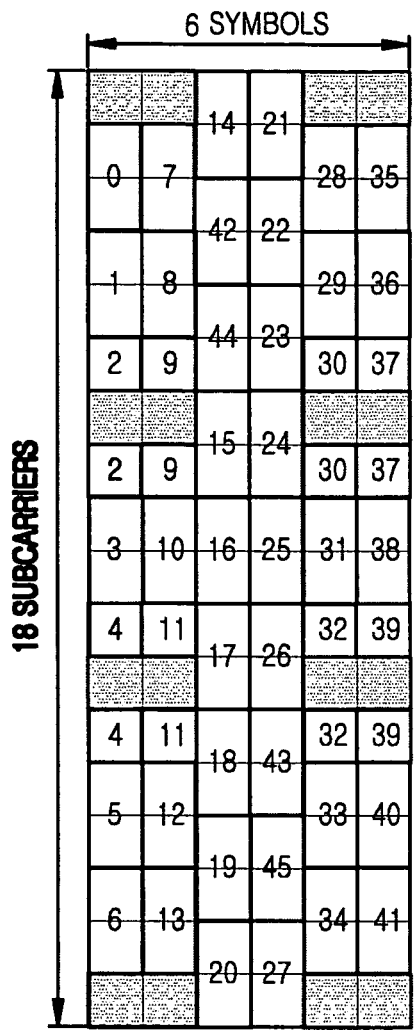
FIGS. 5A and 5B illustrate a resource unit for a tone-based permutation in the diversity subchannel in a wireless communication system according to another exemplary embodiment of the present invention.
Figure 5B:
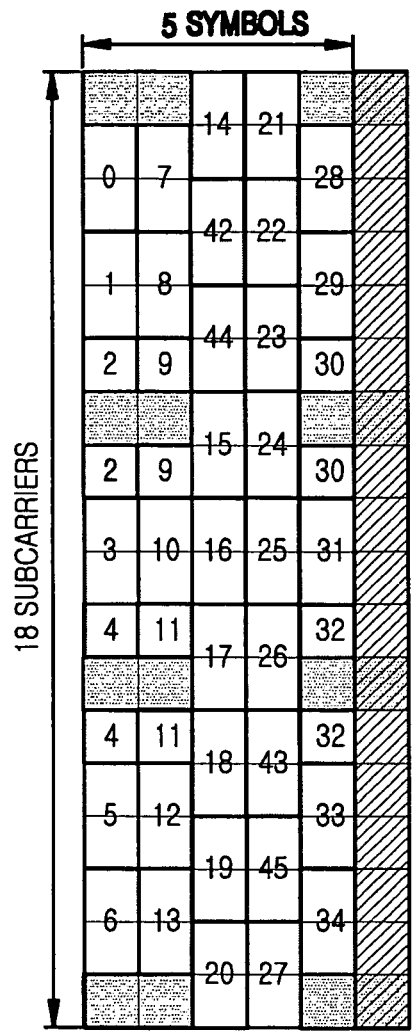

When the PRU includes eighteen (18) pilot tones, the base station forms the tone pairs as shown in FIGS. 5A and 5B.

FIGS. 5A and 5B illustrate an RU for a tone-based permutation in a diversity subchannel in a wireless communication system according to another exemplary embodiment of the present invention.

FIG. 5A shows a regular PRU and FIG. 5B shows an irregular PRU.

In FIG. 5A, the base station forms one tone pair with two adjacent data tones in the frequency axis and produces forty-six (46) tone pairs in order. The base station indexes the tone pairs preferentially in the frequency axis.

In FIG. 5B, when not able to transmit data using the last symbol of the PRU, the base station produces thirty-nine (39) tone pairs in order by forming one tone pair with two adjacent data tones in the frequency axis. The base station indexes the tone pairs preferentially in the frequency axis.

Since there are no pilots only in the third symbol and the fourth symbol of the PRU in FIGS. 5A and 5B, the third symbol and the fourth symbol include a greater number of the data tones than the other symbols. Accordingly, the base station gives the index in order such that the symbols include the same number of the tone pairs. Next, the base station additionally indexes the remaining tone pairs of the third symbol and the fourth symbol. In so doing, the base station randomly shifts the tone pairs additionally indexed not to lie adjacent to each other.

In forming the tone pairs as above, the base station can index the tone pairs in the frequency axis.

Alternatively, the base station may index the tone pairs through a cyclic shift on the $N_{tone}$-ary PRUs allocated to the tone-based diversity subchannel in the time axis and the frequency axis.

Alternatively, the base station may preferentially index the tone pairs in the frequency axis with respect to the OFDMA symbols constituted with $N_{tone}$-ary PRUs allocated to the tone-based diversity subchannel. That is, the base station may preferentially index every tone pair of the l-th OFDMA symbol in the frequency axis.

After indexing the tone pairs, the base station groups the tone pairs of the same number as the PRUs allocated to the tone-based diversity subchannel in order according to the index of the tone pairs. Next, the base station generates an $N_{tone}$-length random sequence. For example, the base station generates the random sequence using the number of the PRUs allocated to the tone-based diversity subchannel and SEED of Equation 1:

$$SEED = [(IDcell + 1024 \times m) \times 1357351] \bmod 2^{20} \quad [\text{Eqn. 1}]$$

In Equation 1, IDcell denotes an ID of the cell or the sector and m denotes a subframe index. Herein, as IDcell is assumed to range from '0' to '1023', '1024' is used in Equation 1.

Alternatively, the base station generates the random sequence using the number of the PRUs allocated to the tone-based diversity subchannel and SEED of Equation 2:

$$SEED = (IDcell \times 1357351) \bmod 2^{20} \quad [\text{Eqn. 2}]$$

In Equation 2, IDcell denotes an ID of the cell or the sector.

After generating the random sequence, using the random sequence, the base station selects the tone pair index to be assigned to the k-th tone pair of the l-th OFDMA symbol constituting the s-th Diversity Resource Unit (DRU) of the tone-based diversity subchannel. For example, the base station selects the tone pair index to be assigned to the k-th tone pair of the l-th OFDMA symbol of the s-th DRU based on Equation 3:

$$\text{tone\_pair}(s,k) = N_{tone} \times n_{k,l} + P_s \lfloor (n_{k,l} + 107 \times l) \bmod N_{tone} \rfloor \quad [\text{Eqn. 3}]$$

In Equation 3, tone_pair(s,k) denotes the tone pair index to be given to the k-th tone pair of the l-th OFDMA symbol of the s-th DRU of the tone-based diversity subchannel, $N_{tone}$ denotes the number of PRUs allocated to the tone-based diversity subchannel, s denotes the index of the DRUs of the tone-based diversity subchannel, k denotes the index of the tone pair constituting one DRU, and $n_{k,l}$ denotes the index for selecting the tone pair. $P_s[e]$ denotes the e-th element after the s-time cyclic shifts of the $N_{tone}$-length sequence. The OFDMA symbol index l depends on the range of the tone pair index value k. 107 can employ other integer number.

In Equation 3, $N_{tone} \times n_{k,l}$ is the expression for indexing the tone pairs. $P_s \lfloor (n_{k,l} + 107 \times l) \bmod N_{tone} \rfloor$ is the expression for selecting the tone pair index to be given to the k-th tone pair of the l-th OFDMA symbol of the s-th DRU of the tone-based diversity subchannel.

The base station selects a random element from the random sequence using $P_s \lfloor (n_{k,l} + 107 \times l) \bmod N_{tone} \rfloor$. Next, the base station determines the tone pair index selected according to the selected element as the k-th tone pair of the s-th DRU.

Alternatively, the base station may select the tone pair index to be given to the k-th tone pair of the l-th OFDMA symbol of the s-th DRU based on Equation 4:

$$\text{tone\_pair}(s,k) = N_{tone} \times n_{k,l} + \{P_s \lfloor (n_{k,l} + 107 \times l) \bmod N_{tone} \rfloor + DL\_PermBase\} \bmod N_{tone} \quad [\text{Eqn. 4}]$$

In Equation 4, tone_pair(s,k) denotes the tone pair index to be given to the k-th tone pair of the l-th OFDMA symbol of the s-th DRU of the tone-based diversity subchannel, $N_{tone}$ denotes the number of PRUs allocated to the tone-based diversity subchannel, s denotes the index of the DRUs of the tone-based diversity subchannel, k denotes the index of the tone pair constituting one DRU, and $n_{k,l}$ denotes the index for selecting the tone pair. $P_s[e]$ denotes the e-th element after the s-time cyclic shifts of the $N_{tone}$-length sequence. The OFDMA symbol index l depends on the range of the tone pair index value k. 107 can employ other integer number.

In Equation 4, $N_{tone} \times n_{k,l}$ is the expression for indexing the tone pairs. $\{P_s \lfloor (n_{k,l} + 107 \times l) \bmod N_{tone} \rfloor + DL\_PermBase\} \bmod N_{tone}$ is the expression for selecting the tone pair index to be given to the k-th tone pair of the l-th OFDMA symbol of the s-th DRU of the tone-based diversity subchannel.

As mentioned above, the base station selects the random element in the random sequence using $\{P_s \lfloor (n_{k,l} + 107 \times l) \bmod N_{tone} \rfloor + DL\_PermBase\} \bmod N_{tone}$ of Equation 4. Next, the base station determines the tone pair index selected according to the selected element as the k-th tone pair of the s-th DRU.

The index $n_{k,l}$ of the PRU for selecting the tone pair in Equation 3 and Equation 4 is calculated based on Equation 5:

$$n_{k,l} = (k + 13 \times s) \bmod N_{pair}^l \quad [\text{Eqn. 5}]$$

In Equation 5, $n_{k,l}$ denotes the index for selecting the tone pair, s denotes the index of the DRUs of the tone-based diversity subchannel, k denotes the index of the tone pair constituting one DRU, and $N_{pair}^l$ denotes the number of the tone pairs constituting the l-th OFDMA symbol in one PRU.

In this embodiment, the base station constitutes the tone-based diversity subchannel by conducting the tone-based permutation.

Alternatively, the base station constitutes the tile-based diversity subchannel by conducting the tile-based permutation.

Figure 6:
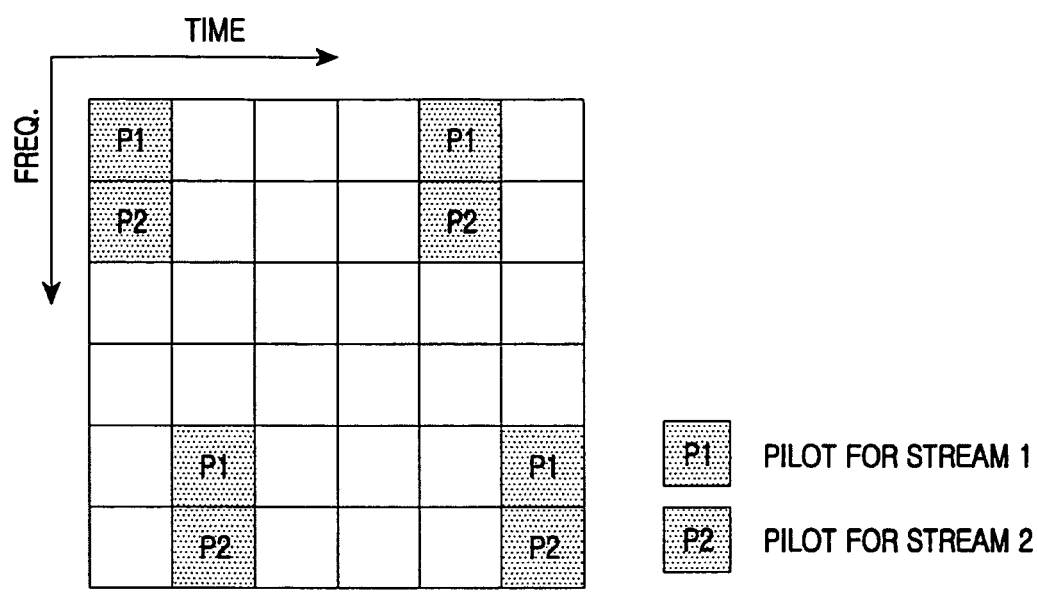
FIG. 6 illustrates a resource unit for a tile-based permutation in the diversity subchannel in the wireless communication system according to one exemplary embodiment of the present invention.

FIG. 6 depicts the RU for the tile-based permutation in the diversity subchannel in the wireless communication system according to one exemplary embodiment of the present invention.

The tile of FIG. 6 is composed with 6 consecutive subcarriers in the frequency axis and 6 consecutive symbols in the time axis.

To compose the tile-based diversity subchannel, using the random sequence, the base station selects the k-th tile constituting the s-th Diversity Resource Unit (DRU) of the tile-based diversity subchannel. For example, the base station selects the index to be assigned to the k-th tile of the s-th DRU based on Equation 6:

$$tile(s,k)=L_{DRU} \times f(s,k)+P_s[(k) \bmod L_{DRU}] \quad [Eqn. 6]$$

In Equation 6, tile(s,k) denotes the index to be given to the k-th tile of the s-th DRU of the tile-based diversity subchannel, $L_{DRU}$ denotes the number of PRUs allocated to the tile-based diversity subchannel, s denotes the index of the DRUs of the tile-based diversity subchannel, k denotes the index of the tile constituting one DRU. $P_s[e]$ denotes the e-th element after the s-time cyclic shifts of the $L_{DRU}$-length sequence.

Alternatively, the base station selects the index to be assigned to the k-th tile of the s-th DRU based on Equation 7:

$$tile(s,k)=L_{DRU} \times f(s,k)+\{P_1[(k) \bmod L_{DRU}]+UL\_PermBase\} \bmod L_{DRU} \quad [Eqn. 7]$$

In Equation 7, tile(s,k) denotes the index to be given to the k-th tile of the s-th DRU of the tile-based diversity subchannel, $L_{DRU}$ denotes the number of PRUs allocated to the tile-based diversity subchannel, s denotes the index of the DRUs of the tile-based diversity subchannel, k denotes the index of the tile constituting one DRU, UL_PermBase denotes cell ID of base station or sector ID of base station. $P_s[e]$ denotes the e-th element after the s-time cyclic shifts of the $L_{DRU}$-length sequence.

Alternatively, the base station selects the index to be assigned to the k-th tile of the s-th DRU based on Equation 8:

$$tile(s,k)=L_{DRU} \times f(s,k)+\{P[(k+a \times s+t) \bmod L_{DRU}]+UL\_PermBase\} \bmod L_{DRU} \quad [Eqn. 8]$$

In Equation 8, tile(s,k) denotes the index to be given to the k-th tile of the s-th DRU of the tile-based diversity subchannel, $L_{DRU}$ denotes the number of PRUs allocated to the tile-based diversity subchannel, s denotes the index of the DRUs of the tile-based diversity subchannel, k denotes the index of the tile constituting one DRU, t denotes the index of a subframe, UL_PermBase denotes cell ID of base station or sector ID of base station. P[e] denotes the e-th element of the $L_{DRU}$-length sequence, a denote random prime number.

The f(s,k) in Equation 6 and Equation 7 and Equation 8 is calculated based on Equation 9:

$$f(s,k)=k$$

$$f(s,k)=(k+13 \times s) \bmod 3 \quad [Eqn. 9]$$

In Equation 9, s denotes the index of the DRUs of the tile-based diversity subchannel, k denotes the index of the tile constituting one DRU.

Now, the base station for composing the subchannel is explained.

Figure 7:
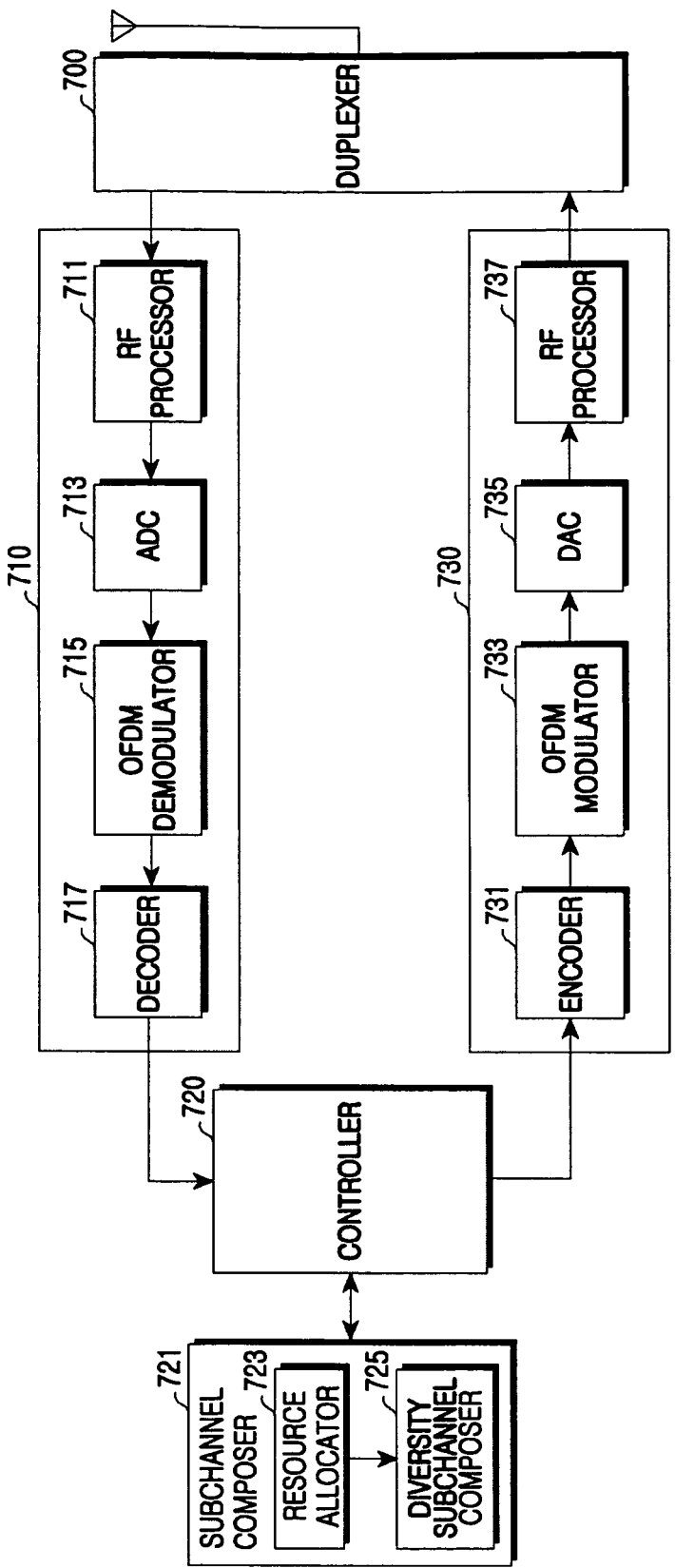
FIG. 7 illustrates a base station for composing the subchannel in the wireless communication system according to an exemplary embodiment of the present invention.

FIG. 7 is a block diagram of the base station for composing the subchannel in the wireless communication system according to an exemplary embodiment of the present invention.

The base station of FIG. 7 includes a duplexer 700, a receiver 710, a controller 720, and a transmitter 730.

The duplexer 700 transmits a transmit signal provided from the transmitter 730 via an antenna and forwards a signal received over the antenna to the receiver 710 in a duplex manner.

The receiver 710 includes a Radio Frequency (RF) processor 711, an Analog/Digital Converter (ADC) 713, an OFDM demodulator 715, and a decoder 717.

The RF processor 711 converts the RF signal fed from the duplexer 700 to a baseband analog signal.

The ADC 713 converts the analog signal output from the RF processor 711 to digital sample data.

The OFDM demodulator 715 converts the time-domain sample data output from the ADC 713 to frequency-domain data through a Fourier transform. For example, the OFDM demodulator 715 performs the Fast Fourier Transform (FFT) using an FFT operator.

The decoder 717 selects data of subcarriers to actually receive from the frequency-domain data output from the OFDM demodulator 715. Next, the decoder 717 demodulates and decodes the selected data according to a preset modulation level (Modulation and Coding Scheme (MCS) level). The modulation level indicates the MCS level.

The controller 720 allocates resources to terminals to service by taking into account channel condition of the terminals within a service coverage. The controller 720 allocates the resources to the terminals in consideration of the subchannel information generated by a subchannel composer 721. The controller 720 confirms and provides the FFR rate information to the subchannel composer 721.

The subchannel composer 721 includes a resource allocator 723 and a diversity subchannel composer 725.

The resource allocator 723 allocates the resources of the entire frequency resources to the band selection subchannel and the diversity subchannel of the region of the frequency reuse factor N and the region of the frequency reuse factor '1' in order. For example, the resource allocator 723 selects and allocates the PRUs to the band selection subchannel and the diversity subchannel of the region of the frequency reuse factor N and the region of the frequency reuse factor '1' as shown in FIG. 2B. The resource allocator 723 allocates the resources of the region of the frequency reuse factor N according to the FFR rate provided from the controller 720.

The diversity subchannel composer 725 composes the PRU-based diversity subchannel by performing the PRU-based permutation on the resources allocated for the diversity subchannel.

Next, the diversity subchannel composer 725 composes the tone-based diversity subchannel or tile-based diversity subchannel by additionally conducting the tone-based permutation or the tile-based permutation. For example, to compose the diversity subchannel of the region of the frequency reuse factor N, the diversity subchannel composer 725 divides the resources of the region of the frequency reuse factor N to N-ary groups. Next, the diversity subchannel composer 725 builds the PRU-based diversity subchannel and the tone-based diversity subchannel per group. In so doing, the diversity subchannel composer 725 may constitute the band selection subchannel per group.

Alternatively, the diversity subchannel composer 725 divides the resources of the region of the frequency reuse factor N to N-ary groups. Next, the diversity subchannel composer 725 builds the PRU-based diversity subchannel and the tile-based diversity subchannel per group. In so doing, the diversity subchannel composer 725 may constitute the band selection subchannel per group.

The transmitter 730 includes an encoder 731, an OFDM modulator 733, a Digital/Analog Converter (DAC) 735, and an RF processor 737. The transmitter 730 also includes a message generator (not shown). The message generator generates a broadcast information message including the subchannel composition information. The subchannel composition information includes the FFT rate and the information relating to the number of the PRUs allocated to the band selection subchannel.

The encoder 731 encodes and modulates signals to be transmitted to the terminals according to the corresponding modulation level using the resource allocated from the controller 720.

The OFDM modulator 733 converts the frequency-domain data output from the encoder 731 to time-domain sample data (OFDM symbols) through an Inverse FFT (IFFT). For example, the OFDM modulator 733 conducts the IFFT using an IFFT operator.

The DAC 735 converts the sample data output from the OFDM modulator 733 to an analog signal.

The RF processor 737 converts the baseband analog signal output from the DAC 735 to an RF signal.

The subchannel composer 721 of the base station may further include a band selection subchannel composer (not shown) for composing the band selection subchannel. For example, the band selection subchannel composer builds the band selection subchannel as shown in FIG. 8 or FIG. 9.

As such, the base station composes the diversity subchannel using the PRUs excluding the subbands selected for the band selection subchannel. The base station builds the band selection subchannel and the diversity subchannel as shown in FIG. 8.

Figure 8:
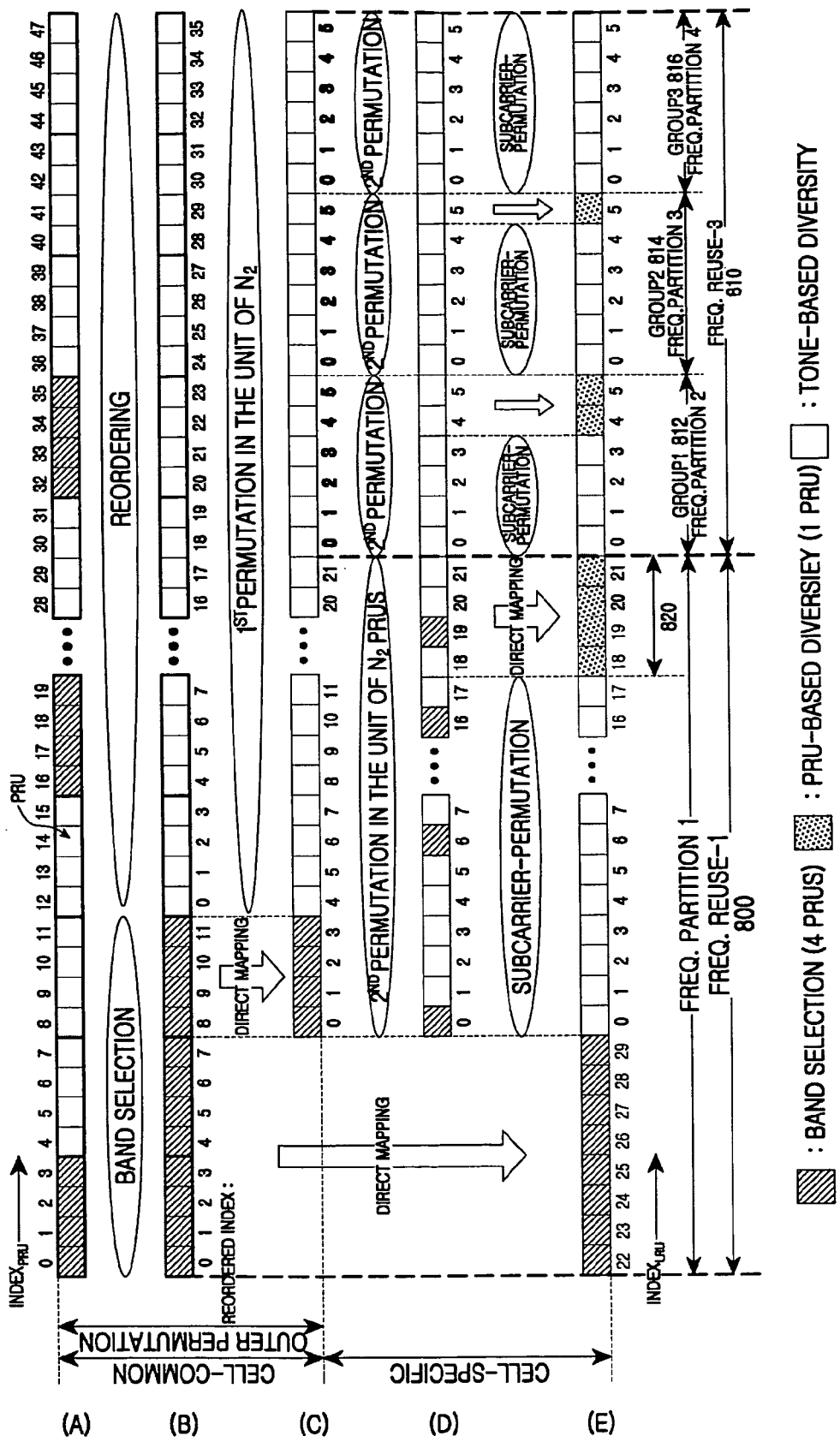
FIG. 8 illustrates a subchannel structure in a wireless communication system according to another exemplary embodiment of the present invention.
Figure 9:
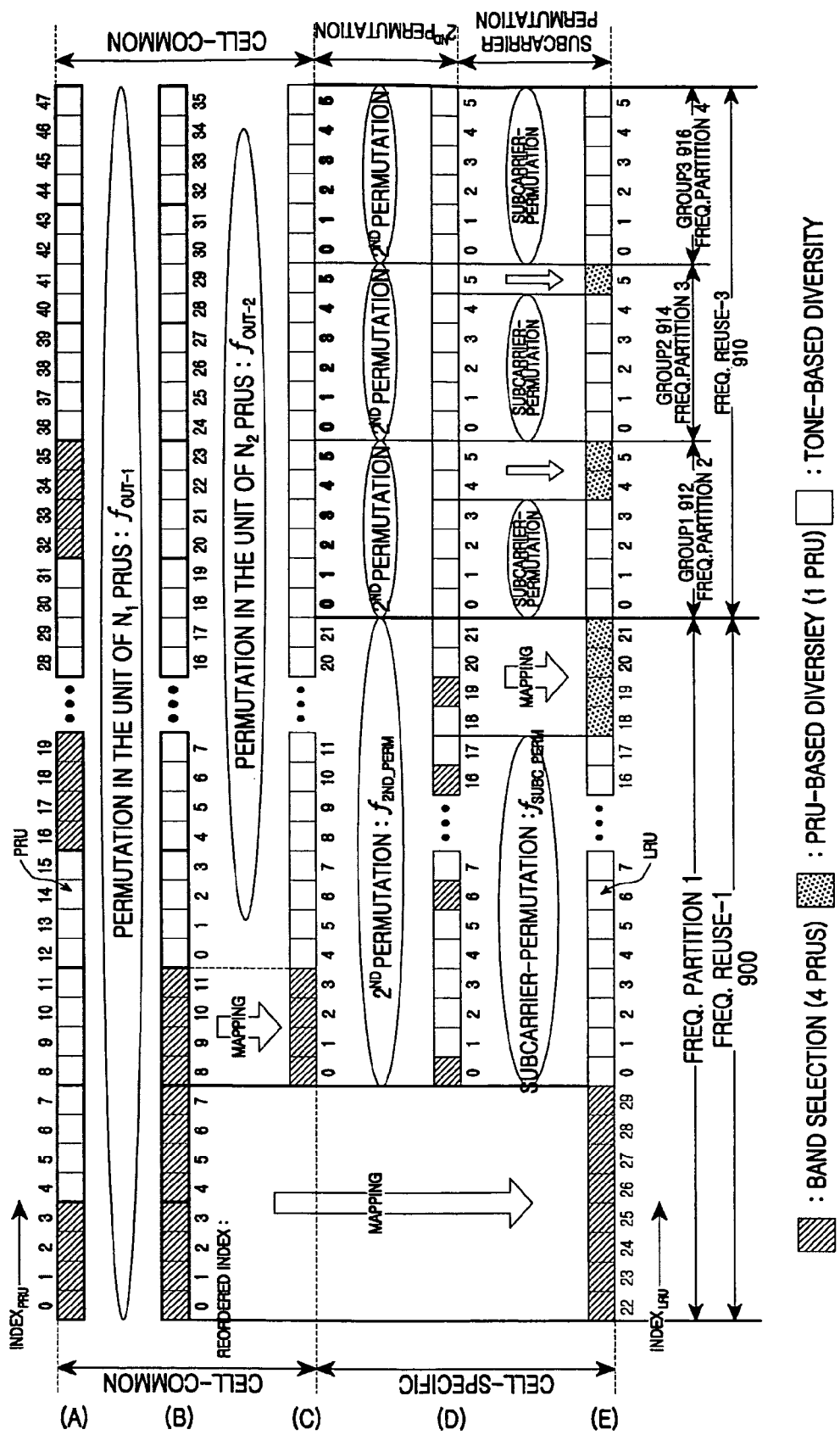
FIG. 9 illustrates a subchannel structure in a wireless communication system according to yet another exemplary embodiment of the present invention.

FIG. 8 illustrates a subchannel structure in a wireless communication system according to another exemplary embodiment of the present invention.

The whole frequency band of the physical channel includes a plurality of PRUs as shown by (A) in FIG. 8. A plurality of adjacent PRUs constitutes one subband.

The base station selects subbands for the band selection subchannel in the whole frequency band as shown by (B) in FIG. 8. For example, the base station selects subbands for the band selection subchannel based on Equation 10. The base station is assumed to select three subbands for the band selection subchannel.

$$\left\lfloor \frac{N_{tot\_band}}{N_{res\_band}} \right\rfloor \times N_{band} \times p(x) + q(x) \quad \text{[Eqn. 10]}$$

In Equation 10, $N_{tot\_band}$ denotes the number of subbands in the entire frequency band used to compose the subchannel, $N_{res\_band}$ denotes the number of subbands selected for the band selection subchannel, $N_{band}$ denotes the number of PRUs in one subband, p(x) and q(x) denote variables for selecting the subbands in a uniform pattern, and x denotes a variable in the same range as the number of the PRUs in the subbands selected for the band selection subchannel.

In Equation 10, p(x) and q(x) are expressed as Equation 11:

$$q(x) = x \bmod N_{band}, \; p(x) = \left\lfloor \frac{x}{N_{band}} \right\rfloor \quad \text{[Eqn. 11]}$$

In Equation 11, p(x) and q(x) denote variables for selecting the subbands in a uniform pattern, $N_{band}$ denotes the number of PRUs in one subband, and x denotes a variable in the same range as the number of the PRUs in the subbands selected for the band selection subchannel.

The base station composes the band selection subchannel with t-ary subbands of the subbands selected for the band selection subchannel as shown by (C) in FIG. 8. When subbands remain in the subbands selected for the band selection subchannel after the band selection subchannel is composed, the base station allocates the remaining subbands as the resource for the diversity subchannel. The value t can vary according to the usage of the band selection subchannel of the base station.

The base station randomly reorders the PRUs not selected for the subbands of the band selection subchannel using $N_2$-based permutation. For example, the base station conducts the $N_2$-based permutation based on Equation 12. Herein, $N_2$ is set to '1' or '2' according to the frequency band. The $N_2$-based permutation is equally applied to every cell and every sector.

$$K \times p(x) + BRO_{\log_2(K)}(q(x)), \; K = \frac{N_{band}}{N_2} \quad \text{[Eqn. 12]}$$

In Equation 12, p(x) and q(x) denote variables for selecting the subbands in a uniform pattern, $N_{band}$ denotes the number of PRUs in one subband, and $N_2$ denotes a unit of the permutation. $BRO_k(y)$ denotes a reciprocal of the k-bit for y. For example, $BRO_3(6)$ is 3(=011(2)).

In Equation 12, p(x) and q(x) are expressed as Equation 13:

$$p(x) = x \bmod (N_{tot\_band} - N_{res\_band}), \quad \text{[Eqn. 13]}$$
$$q(x) = \left\lfloor \frac{x}{N_{tot\_band} - N_{res\_band}} \right\rfloor$$

In Equation 13, p(x) and q(x) denote variables for selecting the subbands in a uniform pattern, $N_{tot\_band}$ denotes the number of subbands in the entire frequency band used to compose the subchannel, $N_{res\_band}$ denotes the number of subbands selected for the band selection subchannel, and x denotes a variable in the same range as the number of the PRUs in the subbands selected for the band selection subchannel.

The base station divides the remaining resources after the band selection subchannel composition into the diversity subchannel of the region 800 of the frequency reuse factor '1' and the region 810 of the frequency reuse factor N according to the FFR rate as shown by (D) in FIG. 8. The remaining resources after the band selection subchannel composition includes the subbands remained after the band selection subchannel composition and the PRUs passing through the $N_2$-based permutation.

The base station splits the resources of the region 810 of the frequency reuse factor N to N-ary frequency reuse groups 812, 814 and 816. For example, given the frequency reuse factor '3', the base station splits the resources of the region 810 of the frequency reuse factor N to three frequency reuse groups 812, 814 and 816. In so doing, the frequency reuse groups 812, 814 and 816 may build the band selection subchannel by selecting the PRUs for the band selection subchannel.

Next, the base station randomly reorders the PRUs using the intrinsic $N_2$-based permutation of the cell or the sector per frequency reuse region. For example, the base station randomly reorders PRUs for the diversity subchannel in the region 800 of the frequency reuse factor '1' using the $N_2$-based permutation. The base station randomly reorders the PRUs for the diversity subchannel in the frequency reuse groups 812, 814 and 816 using different $N_2$-based permutations.

The base station determines the PRU-based diversity subchannel region in each frequency reuse region as shown by (E) in FIG. 8. The base station can determine the PRU-based diversity subchannel region at different rates in the frequency reuse regions. For example, the base station determines four PRUs as the PRU-based diversity subchannel region among the PRUs for the diversity subchannel in the region 800 of the frequency reuse factor '1'. The base station determines two of the PRUs of the first frequency reuse group 812 as the PRU-based diversity subchannel region. The base station determines one of the PRUs of the second frequency reuse group 814 as the PRU-based diversity subchannel region.

Next, the base station determines the PRUs remained after the PRU-based diversity subchannel allocation per frequency reuse region as the tone-based diversity subchannel region or tile-based diversity subchannel region. In so doing, the base station randomly reorders the PRUs determined as the tone-based diversity subchannel region using the tone-based permutation. For example, the base station sequentially arranges the PRUs remained after the PRUs for the PRU-based diversity subchannel are selected. The base station can apply different tone-based permutations in the frequency reuse regions.

Alternatively, the base station randomly reorders the PRUs determined as the tile-based diversity subchannel region using the tile-based permutation. The base station randomly extracts PRUs for composing the PRU-based diversity subchannel through the $N_2$-based permutation in the region 800 of the frequency reuse factor '1' and the frequency reuse groups 812, 814 and 816. Next, the base station can allocate the PRUs remained after the extraction through the $N_2$-based permutation, as the tone-based diversity subchannel or tile-based diversity subchannel.

The base station may compose the band selection subchannel and the diversity subchannel as shown in FIG. 9.

FIG. 9 illustrates a subchannel structure in a wireless communication system according to yet another exemplary embodiment of the present invention.

The whole frequency band of the physical channel includes a plurality of PRUs as shown by (A) in FIG. 9. A plurality of adjacent PRUs constitutes one subband.

The base station randomly reorders subbands of the frequency band using $N_1$-based permutations as shown by (B) in FIG. 9. For example, the base station carries out the $N_1$-based permutation based on Equation 14. The N-based permutation is equally applied to every sector and cell. The $N_1$ basis indicates the subband unit.

$$\left\lfloor \frac{N_{tot\_band}}{N_{res\_band}} \right\rfloor \times N_{band} \times p(x) + N_{band} \times q(x) + h(x) \quad \text{[Eqn. 14]}$$

In Equation 14, $N_{tot\_band}$ denotes the number of subbands in the entire frequency band used to compose the subchannel, $N_{res\_band}$ denotes the number of subbands selected for the band selection subchannel, $N_{band}$ denotes the number of PRUs in one subband, p(x), q(x) and h(x) denote variables for selecting the subbands in a uniform pattern, and x denotes a variable in the same range as the number of the PRUs in the subbands selected for the band selection subchannel.

The base station determines the $N_1$-based permutation type according to the number of the subbands to be selected as the band selection subchannel based on Equation 14.

In Equation 13, p(x), q(x) and h(x) are expressed as Equation 15:

$$p(x) = \left\lfloor \frac{x}{N_{band}} \right\rfloor \bmod N_{res\_band}, \quad \text{[Eqn. 15]}$$

$$q(x) = \left\lfloor \frac{x}{N_{band} \times N_{res\_band}} \right\rfloor \quad h(x) = x \bmod N_{band}$$

In Equation 15, p(x), q(x) and h(x) denote variables for selecting the subbands in a uniform pattern, $N_{band}$ denotes the number of PRUs in one subband, x denotes a variable in the same range as the number of the PRUs in the subbands selected for the band selection subchannel, and $N_{res\_band}$ denotes the number of subbands to be selected for the band selection subchannel.

Alternatively, the base station carries out the $N_1$-based permutation based on Equation 16:

$$N_{dist} \times N_{band} \times p(x) + N_{band} \times q(x) + h(x) \quad \text{[Eqn. 16]}$$

In Equation 16, $N_{dist}$ denotes a distance between adjacent subbands reordered through the subband-based permutation, $N_{band}$ denotes the number of PRUs in one subband, p(x), q(x) and h(x) denote variables for selecting the subbands in a uniform pattern, and x denotes a variable in the same range as the number of the PRUs in the subbands selected for the band selection subchannel.

The base station determines the $N_1$-based permutation type according to the number of subbands to be selected as the band selection subchannel based on Equation 16.

In Equation 16, p(x), q(x) and h(x) are expressed as Equation 17:

$$p(x) = \left\lfloor \frac{x}{N_{band}} \right\rfloor \bmod N_s, \quad \text{[Eqn. 17]}$$

$$q(x) = \left\lfloor \frac{x}{N_{band} \times N_s} \right\rfloor \quad h(x) = x \bmod N_{band}$$

In Equation 17, p(x), q(x) and h(x) denote variables for selecting the subbands in a uniform pattern, $N_{band}$ denotes the number of PRUs in one subband, x denotes a variable in the same range as the number of the PRUs in the subbands selected for the band selection subchannel, and $N_s$ denotes the number of subbands in $N_{dist}$. Herein, $N_s$ can be expressed as Equation 18:

$$N_s = \frac{N_{tot\_band}}{N_{dist}} \quad \text{[Eqn. 18]}$$

In Equation 18, $N_s$ denotes the number of the subbands in $N_{dist}$, $N_{tot\_band}$ denotes the number of subbands in the entire frequency band used to compose the subchannel, and $N_{dist}$ denotes the distance between adjacent subbands reordered through the subband-based permutation.

In Equations 16 and 18, $N_{dist}$ can be calculated based on Equation 19:

$$N_{dist} = \begin{cases} 2, & \left\lfloor \frac{N_{tot\_band}}{N_{res}} \right\rfloor == 1 \\ \left\lfloor \frac{N_{tot\_band}}{N_{res}} \right\rfloor, & \text{otherwise} \end{cases} \quad [\text{Eqn. 19}]$$

In Equation 19, $N_{dist}$ denotes the distance between adjacent subbands reordered through the subband-based permutation, $N_{tot\_band}$ denotes the number of subbands in the entire frequency band used to compose the subchannel, and $N_{res}$ denotes a variable determined by $N_{res\_band}$ based on Equation 21 or Equation 22.

Even when the number of the subbands $N_{res\_band}$ to be selected for the band selection subchannel based on Equation 19 increases, the distance between the neighbor subbands reordered through the subband-based permutation is set to the double of the minimum subband unit. Thus, '2' in Equation 18 can be altered according to the minimum distance between the neighbor subbands reordered through the subband-based permutation set by the base station.

In Equations 15 and 18, $N_{dist}$ may be calculated based on Equation 20:

$$N_{dist} = \left\lfloor \frac{N_{tot\_band}}{N_{res}} \right\rfloor \quad [\text{Eqn. 20}]$$

In Equation 20, $N_{dist}$ denotes the distance between adjacent subbands reordered through the subband-based permutation, $N_{tot\_band}$ denotes the number of subbands in the entire frequency band used to compose the subchannel, and $N_{res}$ denotes a variable determined by $N_{res\_band}$ based on Equation 21 or Equation 22:

$$N_{res} = \begin{cases} 4, & N_{res\_band} < 4 \\ N_{res\_band}, & \text{otherwise} \end{cases} \quad [\text{Eqn. 21}]$$

In Equation 21, $N_{res}$ denotes the variable determined by $N_{res\_band}$ to make the distance between neighbor subbands reordered through the subband-based permutation double the minimum subband unit, and $N_{res\_band}$ denotes the number of the subbands selected for the band selection subchannel.

Even when the number of the subbands $N_{res\_band}$ to be selected for the band selection subchannel decreases in Equation 21, the base station ensures to make the frequency diversity order exceed at least 4 when composing the diversity subchannel. '4' in Equation 21 may be altered according to the frequency diversity order guaranteed by the base station at minimum.

$$N_{res} = N_{res\_band} \quad [\text{Eqn. 22}]$$

In Equation 22, $N_{res}$ denotes the variable determined by $N_{res\_band}$ to make the distance between neighbor subbands reordered through the subband-based permutation double the minimum subband unit, and $N_{res\_band}$ denotes the number of the subbands selected for the band selection subchannel.

After carrying out the Ni-based permutation based on Equation 14 or Equation 16, the base station selects $N_{res\_band}$-ary subbands as the resources for the band selection subchannel. The base station selects the resources for the band selection subchannel in the region 900 of the frequency reuse factor '1'.

As shown by (C) in FIG. 9, the base station composes the band selection subchannel with t-ary subbands of $N_{res\_band}$-ary subbands selected for the band selection subchannel. When there remain subbands in the subbands selected for the band selection subchannel after the band selection subchannel composition, the base station allocates the remaining subbands as the resources for the diversity subchannel. Herein, t can be set to various values according to the usage of the band selection subchannel in the base station.

The base station randomly reorders the PRUs not selected as the subbands for composing the band selection subchannel using $N_2$-based permutation. For example, the base station performs the $N_2$-based permutation based on Equation 12. Herein, $N_2$ is set to '1' or '2' according to the frequency band. The $N_2$-based permutation is equally applied to every cell and every sector.

As shown by (D) in FIG. 9, the base station divides the remaining resources after the band selection subchannel composition, to the diversity subchannel of the region 900 of the frequency reuse factor '1' and the diversity subchannel of the region 910 of the frequency reuse factor 'N' according to the FFR rate. Herein, the remaining resources after the band selection subchannel composition includes the subbands remained after the band selection subchannel composition and the PRUs passing through the $N_2$-based permutation.

The base station splits the resources of the region 910 of the frequency reuse factor 'N' to N-ary frequency reuse groups 912, 914 and 916. For example, given the frequency reuse factor '3', the base station splits the resources of the region 910 of the frequency reuse factor N to three frequency reuse groups 912, 914 and 916. The frequency reuse groups 912, 914 and 916 can compose the band selection subchannel by selecting the PRUs for the band selection subchannel.

Next, the base station randomly reorders the PRUs using the intrinsic $N_2$-based permutation of the cell or the sector per frequency reuse region. For example, the base station randomly reorders the PRUs for composing the diversity subchannel in the region 900 of the frequency reuse factor '1' using the $N_2$-based permutation. The base station shuffles the PRUs by applying different $N_2$-based permutations to the groups 912, 914 and 916.

As shown by (E) in FIG. 9, the base station determines the PRU-based diversity subchannel region in the frequency reuse regions. The base station can determine the PRU-based diversity subchannel region in the frequency reuse regions at different rates. For example, the base station determines four of the PRUs for composing the diversity subchannel in the region 900 of the frequency reuse factor '1', as the PRU-based diversity subchannel region. The base station determines two of the PRUs for forming the first frequency reuse group 912 as the PRU-based diversity subchannel region. The base station determines one of the PRUs for forming the second frequency reuse group 914 as the PRU-based diversity subchannel region.

Next, the base station determines the PRUs remained after the PRU-based diversity subchannel allocation per frequency reuse region, to the tone-based diversity subchannel region or tile-based diversity subchannel. The base station randomly reorders the PRUs determined to the tone-based diversity subchannel region using the tone-based permutation. For example, the base station sequentially arranges the PRUs remained after selecting the PRUs for the PRU-based diversity subchannel. In doing so, the base station can apply different tone-based permutations in the frequency reuse regions.

Alternatively, the base station randomly reorders the PRUs determined to the tile-based diversity subchannel region using the tile-based permutation. For example, the base station sequentially arranges the PRUs remained after selecting the PRUs for the PRU-based diversity subchannel. In doing so, the base station can apply different tile-based permutations in the frequency reuse regions.

As stated above, the PRU-based diversity subchannel may be used as the PRU-based band selection subchannel according to the operation policy of the PRUs. More specifically, when the PRUs used as the PRU-based diversity subchannel are allocated to one terminal, the PRUs are used as the PRU-based diversity subchannel. By contrast, when the PRUs are allocated to different terminals, the PRUs are used as the PRU-based band selection subchannel.

The base station composes the diversity subchannel and the band selection subchannel in the region of the frequency reuse factor '1' and the region of the frequency reuse factor 'N'.

The terminal serviced by the base station should be able to compose the same subchannel as the base station. The base station transmits the subchannel composition information to the terminals so that the terminal serviced can compose the same subchannel. For example, the base station can transmit the subchannel composition information to the terminals over the BCH periodically using the super frame header. The subchannel composition information includes the FFR rate information, the location information of the PRUs allocated in the region of the frequency reuse factor N, and the information relating to the number of the PRUs allocated as the band selection subchannel.

Accordingly, using the subchannel composition information received from the base station, the terminal can compose the diversity subchannel and the band selection subchannel in the region of the frequency reuse factor '1' and the region of the frequency reuse factor 'N' as in the serving base station.

As set forth above, the wireless communication divides the resources into the sub resource units and composes the diversity subchannel with the divided resources using the tone-based permutation in the sub resource unit. Therefore, the diversity subchannel for the diversity gain can be achieved in the radio resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for composing a subchannel in a wireless communication system, the method comprising:
performing, via control of a controller, a first permutation on resources for composing a subchannel;
dividing, via control of the controller, the first permutated resources into a first group and a second group;
composing, via control of the controller, a third group using resources in the first group;
performing, via control of the controller, a second permutation on resources in the second group; and
composing, via control of the controller, a fourth group using resources remaining in the first group after the third group is composed and the second group is permutated.

2. The method of claim 1, wherein the first permutation comprises a sub-band based permutation and the second permutation comprises a resource allocation unit based permutation.

3. The method of claim 2, wherein the subband comprises two or more resource allocation units.

4. The method of claim 2, wherein the resource allocation unit comprises 18 subcarriers and 6 symbols.

5. The method of claim 1, wherein the third group comprises a band selection subchannel and the fourth group comprises a diversity subchannel.

6. The method of claim 1, further comprising:
composing a fifth group using resources in the fourth group;
performing a third permutation on resources remaining in the fourth group after the fifth group is composed; and
composing a sixth group using the third permutated resources,
wherein the third permutation comprises a tone pair-based permutation,
wherein the tone pair-based permutation comprises two consecutive tones,
wherein the fifth group comprises a resource allocation unit based diversity subchannel, and
wherein the sixth group comprises a tone based diversity channel.

7. The method of claim 6, further comprising:
performing a fourth permutation on resources remaining in the fourth group after the fifth group is composed; and
composing a seventh group using the fourth permutated resources,
wherein the fourth permutation comprises a tile-based permutation, and
wherein the seventh group comprises a tile based diversity subchannel.

8. The method of claim 1, further comprising:
dividing the fourth group into a region of a frequency reuse factor equal to 1 and a region of a frequency reuse factor equal to an integer N greater than 1.

9. The method of claim 8, further comprising:
composing a fifth group using resources within the fourth group in the region of the frequency reuse factor 1, wherein the fifth group comprises a resource allocation unit based diversity subchannel.

10. The method of claim 8, wherein the region of the frequency reuse factor N comprises N-ary frequency reuse groups.

11. The method of claim 10, further comprising:
determining at least one frequency reuse group for composing a band selection subchannel, and composing the band selection subchannel by selecting at least one sub-band within each frequency reuse group.

12. The method of claim 11, further comprising:
composing a resource allocation unit based diversity subchannel for each frequency reuse group by selecting at least one resource allocation unit of resources remaining after the band selection subchannel is composed in each frequency reuse groups.

13. The method of claim 12, further comprising:
performing a fifth permutation on resources remaining after the resource allocation unit based diversity subchannel is composed in each frequency reuse group; and
composing a tone-based diversity subchannel using the fifth permutated resources in each frequency reuse group,
wherein the fifth permutation comprises a tone pair-based permutation.

14. The method of claim 12, further comprising;
performing a sixth permutation on resources remaining after the resource allocation unit based diversity subchannel is composed in each frequency reuse group; and
composing a tile-based diversity subchannel using the sixth resources in each frequency reuse group.

15. The method of claim 9, further comprising:
performing a third permutation on resources remaining in the region of the frequency reuse factor 1 after the fifth group is composed; and
composing a sixth group using the third permutated resources,
wherein the third permutation is a tone pair-based permutation,
wherein the tone pair-based permutation comprises two consecutive tones, and
wherein the sixth group comprises a tone-based diversity subchannel.

16. The method of claim 15, further comprising;
performing a fourth permutation on resources remaining in the region of the frequency reuse factor 1 after the fifth group is composed; and
composing a seventh group using the fourth permutated resources,
wherein the fourth permutation is a tile-based permutation, and
wherein the seventh group comprises a tile-based diversity subchannel.

17. An apparatus configured to compose a subchannel in a wireless communication system, the apparatus comprising:
a resource allocator configured to perform a first permutation on resources for composing a subchannel, and to divide the first permutated resources to a first group and a second group;
a band selection subchannel composer configured to compose a third group using resources in the first group; and
a diversity subchannel composer configured to perform a second permutation on resources in the second group, and to compose a fourth group using resources remaining in the first group after the third group is composed and the second group is permutated.

18. The apparatus of claim 17, wherein the resource allocation unit comprises 18 subcarriers and 6 symbols.

19. The apparatus of claim 17, wherein the diversity subchannel composer is configured to:
compose a fifth group using resources in the fourth group,
perform a third permutation on resources remaining in the fourth group after the fifth group is composed, and
compose a sixth group using the third permutated resources,
wherein the third permutation is a tone pair-based permutation,
wherein the tone pair comprises two consecutive tones,
wherein the fifth group comprises a resource allocation unit based diversity subchannel, and
wherein the sixth group comprises a tone based diversity subchannel.

20. The apparatus of claim 19, wherein the diversity subchannel composer is configured to:
perform a fourth permutation on resources remaining in the fourth group after the fifth group is composed; and
compose a seventh group using the fourth permutated resources,
wherein the fourth permutation comprises a tile-based permutation, and
wherein the seventh group is a tile based diversity subchannel.

21. The apparatus of claim 17, wherein the resource allocator is configured to divide the fourth group into a region of a frequency reuse factor equal to 1 and a region of a frequency reuse factor equal to an integer N greater than 1, and to split the region of the frequency reuse factor N to N-ary frequency reuse groups.

22. The apparatus of claim 21, wherein the diversity subchannel composer is configured to compose a fifth group using resources within the fourth group in the region of the frequency reuse factor 1, and
wherein the fifth group comprises a resource allocation unit based diversity subchannel.

23. The apparatus of claim 22, wherein the diversity subchannel composer is configured to:
perform a third permutation on resources remaining in the region of the frequency reuse factor 1 after the fifth group is composed; and
compose a sixth group using the third permutated resources,
wherein the third permutation comprises a tone pair-based permutation,
wherein the tone pair comprises two consecutive tones, and
wherein the sixth group comprises a tone-based diversity subchannel.

24. The apparatus of claim 23, wherein the band selection subchannel composer is configured to determine at least one frequency reuse group for composing a band selection subchannel, and to compose the band selection subchannel by selecting at least one subband within each frequency reuse group.

25. The apparatus of claim 24, wherein the diversity subchannel composer is configured to compose a resource allocation unit based diversity subchannel for each frequency reuse group by selecting at least one resource allocation unit of the resources remaining after the band selection subchannels is composed in the frequency reuse groups.

26. The apparatus of claim 25, wherein the diversity subchannel composer is configured to:
perform a fifth permutation on resources remaining after the resource allocation unit based diversity subchannel is composed in each frequency reuse group; and
compose a tone-based diversity subchannel using the fifth permutated resources in each frequency reuse group,
wherein the fifth permutation is a tone pair-based permutation.

27. The apparatus of claim 17, wherein the first permutation comprises a sub-band based permutation and the second permutation comprises a resource allocation unit based permutation.

28. The apparatus of claim 27, wherein the subband comprises two or more resource allocation units.

29. The apparatus of claim 17, wherein the third group comprises a band selection subchannel and the fourth group comprises a diversity subchannel.

30. The apparatus of claim 22, wherein the diversity subchannel composer is configured to perform a fourth permutation on resources remaining in the region of the frequency reuse factor 1 after the fifth group is composed, and compose a seventh group using the third permutated resources,
wherein the fourth permutation comprises a tile-based permutation, and
wherein the seventh group comprises a tile-based diversity subchannel.

31. The apparatus of claim 25, wherein the diversity subchannel composer is configured to perform a sixth permutation on resources remaining after the resource allocation unit based diversity subchannel is composed in each of the frequency reuse groups, and compose a tile-based diversity subchannel using the sixth permutated resources in each frequency reuse group.

* * * * *

UNITED STATES PATENT AND TRADEMARK OFFICE
CERTIFICATE OF CORRECTION

PATENT NO. : 8,451,866 B2
APPLICATION NO. : 12/381250
DATED : May 28, 2013
INVENTOR(S) : Tae-Young Kim et al.

It is certified that error appears in the above-identified patent and that said Letters Patent is hereby corrected as shown below:

In the Claims

In Column 19, line 6, delete the phrase "sixth resources" and insert --sixth permutated resources--

Signed and Sealed this
Twenty-fourth Day of February, 2015

Michelle K. Lee
*Deputy Director of the United States Patent and Trademark Office*